(12) United States Patent
Tokita et al.

(10) Patent No.: US 7,270,476 B2
(45) Date of Patent: Sep. 18, 2007

(54) ELECTRONIC CLINICAL THERMOMETER WITH QUICK TEMPERATURE ESTIMATING DEVICE

(75) Inventors: Muneo Tokita, Nagaokakyo (JP); Shigeru Tomioka, Kyoto (JP)

(73) Assignee: OMRON Healthcare Co., Ltd., Kyoto (JP)

( * ) Notice: Subject to any disclaimer, the term of this patent is extended or adjusted under 35 U.S.C. 154(b) by 0 days.

(21) Appl. No.: 10/837,207

(22) Filed: Apr. 30, 2004

(65) Prior Publication Data

US 2005/0041722 A1    Feb. 24, 2005

(30) Foreign Application Priority Data

Aug. 21, 2003    (JP)    ............................. 2003-297892

(51) Int. Cl.
*G01K 3/00*    (2006.01)
(52) U.S. Cl. .................. 374/107; 374/104; 374/112
(58) Field of Classification Search ........... 374/104, 374/107, 103, 112, 102, 169; 600/549, 474; 702/131, 133, 135
See application file for complete search history.

(56) References Cited

U.S. PATENT DOCUMENTS

| | | | | | |
|---|---|---|---|---|---|
| 4,183,248 | A | * | 1/1980 | West | 374/164 |
| 4,565,456 | A | * | 1/1986 | Iida et al. | 374/169 |
| 4,682,898 | A | * | 7/1987 | Janssen | 374/179 |
| 4,691,713 | A | * | 9/1987 | Suzuki | 600/549 |
| 4,877,333 | A | * | 10/1989 | Ota et al. | 374/169 |
| 5,066,141 | A | * | 11/1991 | Ikeda et al. | 374/169 |
| 5,169,235 | A | * | 12/1992 | Tominaga et al. | 374/129 |
| 5,259,389 | A | * | 11/1993 | Muramoto et al. | 600/546 |
| 5,738,441 | A | * | 4/1998 | Cambridge et al. | 374/102 |
| 6,270,252 | B1 | * | 8/2001 | Siefert | 374/102 |
| 6,280,397 | B1 | * | 8/2001 | Yarden et al. | 600/549 |
| 6,439,768 | B1 | * | 8/2002 | Wu et al. | 374/169 |
| 6,513,970 | B1 | * | 2/2003 | Tabata et al. | 374/131 |
| 6,626,568 | B2 | * | 9/2003 | Sato et al. | 374/121 |
| 6,698,921 | B2 | * | 3/2004 | Siefert | 374/169 |
| 6,827,487 | B2 | * | 12/2004 | Baumbach | 374/164 |
| 6,886,978 | B2 | * | 5/2005 | Tokita et al. | 374/169 |
| 6,890,096 | B2 | * | 5/2005 | Tokita et al. | 374/163 |
| 6,991,368 | B2 | * | 1/2006 | Gerlitz | 374/121 |

FOREIGN PATENT DOCUMENTS

| | | | |
|---|---|---|---|
| JP | 61259130 A | * | 11/1986 |
| WO | WO 2066946 A2 | * | 8/2002 |

* cited by examiner

*Primary Examiner*—Gail Verbitsky
*Assistant Examiner*—Mirellys Jagan
(74) *Attorney, Agent, or Firm*—Beyer Weaver LLP

(57) ABSTRACT

An electronic clinical thermometer has one of two temperature measuring devices each for measuring a live body temperature. A temperature estimating device estimates an equilibrium body temperature from a first data item related to change in temperature measured by the temperature measuring device during an initial period within a specified time such as about 20 seconds from the start of a measurement and a second data item related to a change in temperature measured by the temperature measuring device after the initial period. If two temperature measuring devices are used, the first data item may be related to the difference between temperatures measured by these two temperature measuring devices and the second data item may be related to the time-rate of change in temperature measured by either of the two temperature measuring devices. The first data item may be a value obtained from the linear relationship between the temperature value measured by either of the two temperature measuring devices and the difference between them.

13 Claims, 6 Drawing Sheets

ELECTRONIC CLINICAL THERMOMETER WITH QUICK TEMPERATURE ESTIMATING DEVICE

BACKGROUND OF THE INVENTION

This invention relates to electronic clinical thermometers of the temperature-estimating type.

Electronic clinical thermometers are roughly divided into two categories. Thermometers of one of the categories are adapted to directly display the temperature of its temperature-measuring element inside a temperature-measuring part. With a thermometer of this type, its temperature-measuring part is placed under the arm or inside the mouth where temperature is intended to be measured, and the measured temperature when it stops rising, or the equilibrium temperature, is considered to be the body temperature at the desired body part. It is generally considered to take about 5 minutes to reach an equilibrium temperature if such a thermometer is placed in the mouth and more than 10 minutes if it is inserted under the arm. Some thermometers of this type are adapted to activate a buzzer when the temperature rise becomes smaller than a specified value and to end the measurement of temperature. With such a thermometer, the measurement may be completed within 3-5 minutes but the actually measured temperature is somewhat lower than the equilibrium temperature.

Japanese Patent Publications Tokkai 52-75385, 55-78220 and 59-187233 and Tokko 7-111383 have disclosed electronic clinical thermometers of the temperature-estimating type adapted to display an estimated equilibrium temperature by extracting the relationship between the characteristics of the temperature-change curve and the equilibrium temperature by a statistical method or from a heat transfer equation, calculating a correction value based on such extracted relationship and adding this calculated value to the current temperature value actually being measured. Thermometers of this type display an estimated result in 1-2 minutes after the measurement is started.

Prior art thermometers of this type make an estimate on the basis of a measured temperature value and the slope of its rise at a certain point in time, or by deriving a heat transfer equation for a situation where a very small object has been heated and carrying out an analysis by a curve approximation method. By such methods, the earlier measured values of the temperature curve are essentially not utilized and only its portion after some length of time has already passed or the transfer of heat from an internal point in the live body to its surface is considered. In other words, the earlier portion was not used in the analysis because it is easily influenced by the initial condition of the temperature-measuring part and the skin surface and such conditions are unstable.

With prior art thermometers of this type, the accuracy of estimate was generally poor especially if the time of measurement was short because the effects of the initial conditions were ignored. For this reason, the user had to wait until the effects of the initial conditions would disappear for obtaining an accurate result. A measurement time of about 60-120 seconds is usually required with a prior art thermometer of this type.

SUMMARY OF THE INVENTION

It is therefore an object of this invention to provide an electronic clinical thermometer capable of accurately and quickly estimating the temperature.

An electronic clinical thermometer according to this invention may be characterized as comprising a temperature measuring device for measuring a live body temperature and a temperature estimating device for estimating an equilibrium body temperature from a first data item related to change in temperature measured by the temperature measuring device during an initial period from the start of a measurement until a specified condition becomes satisfied and a second data item related to change in temperature measured by the temperature measuring device after this initial period. In the above, the specified condition that ends the initial period may be that a peak be detected in the time-rate of change in temperature measured by said temperature measuring device. The initial period may be typically in the range of 3-30 seconds, or about 20 seconds. With a thermometer thus characterized, the equilibrium temperature can be estimated at least in part from the initial temperature change data and a highly accurate measurement of temperature becomes possible within a short measuring time.

In the above, what was referred to as the first data item may be a physical quantity other than temperature such as the time length during which the temperature measured by the temperature measuring device continues to rise. The second data item may be a time-rate of change in temperature.

The electronic clinical thermometer of the invention may have two temperature measuring devices placed at two different body positions with different thermal characteristics. In such a case, the first data item may relate to the difference between temperatures measured by these two temperature measuring devices and the second data item may relate to the time-rate of change in temperature measured by either of the two temperature measuring devices. Alternatively, the first data item may be a value obtained from the linear relationship between the temperature value measured by either of the two temperature measuring devices and the difference between the temperatures measured by them.

With a thermometer embodying the invention, body temperature of a patient can be measured accurately within a short time.

BRIEF DESCRIPTION OF THE DRAWINGS

Throughout herein some of like components are indicated by the same numerals although they may be components of different thermometers and may not be described repetitiously for the sake of simplicity of description.

DETAILED DESCRIPTION OF THE INVENTION

The invention is described next by way of examples.

Figure 1:
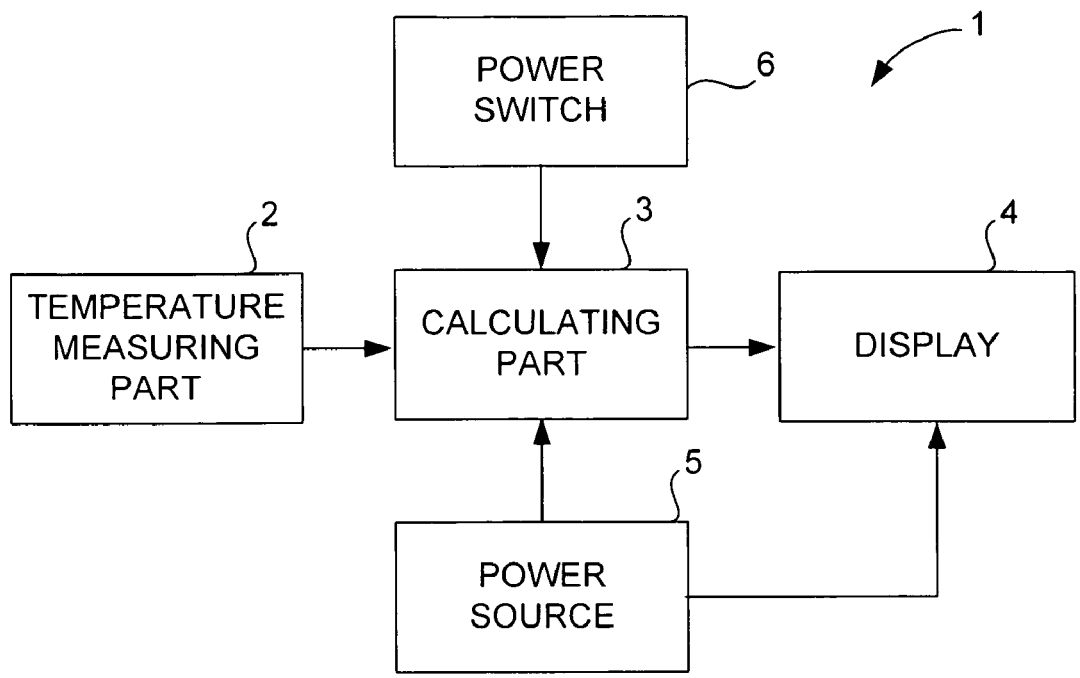
FIG. 1 is a block diagram for showing the basic structure of an electronic clinical thermometer of the type embodying this invention for estimating a body temperature.

FIG. 1 is a block diagram that shows the basic structure of an electronic clinical thermometer 1 of the type embodying this invention for estimating the body temperature, comprising a temperature measuring part (or "temperature measuring device") 2, a calculating part (or "temperature estimating device") 3 for calculating an estimated equilibrium body temperature, a display 4 for displaying the estimated equilibrium body temperature calculated by the calculating part 3, a power source 5 for supplying electric power to the calculating part 3 and the display 4, and a power switch 6 for switching on and off the supply of electric power from the power source 5. The temperature measuring part 2 may comprise a temperature sensor such as a thermistor. The calculating part 3 monitors the signals received from the temperature sensor of the temperature measuring part 2 and estimates the equilibrium temperature at a specified inner body part on the basis of data such as the measured temperature values and time values. The results of calculations performed by the calculating part 3 are transmitted to the display 4 to be displayed.

Figure 2A:
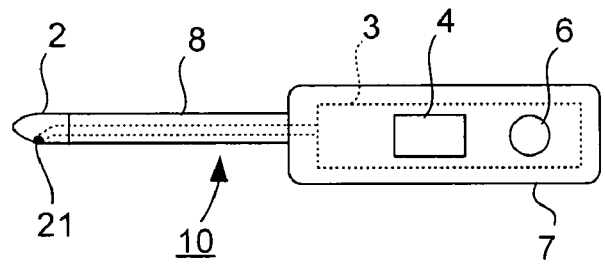
FIGS. 2A and 2B are schematic drawings for showing the structures of electronic clinical thermometers 10 and 11, respectively.
Figure 2B:
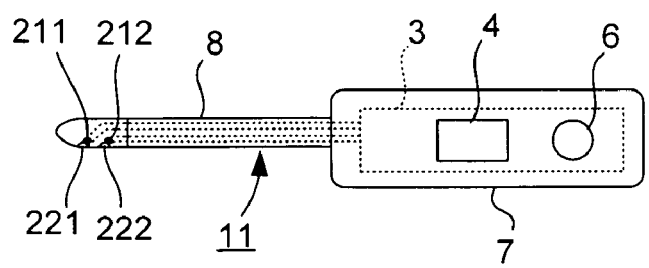

FIGS. 2A and 2B show the structures of electronic clinical thermometers 10 and 11, respectively. The thermometers 10 and 11 each have a main body 7 generally of the shape of a rectangular parallelepiped and an elongated probe 8 extending in the longitudinal direction of the main body 7 from one of its end parts. The main body 7 is provided with a display 4 and a power switch 6 exposed externally. A temperature measuring part 2 of the thermometer 10 is at the tip of its probe 8, and a temperature sensor 21 is disposed on the inner surface of the hollow interior of the temperature measuring part 2. Heat is transferred from the outer surface of the temperature measuring part 2 to the temperature sensor 21. The temperature sensor 21 is electrically connected to the calculating part 3 disposed inside the main body 7 such that outputs from the temperature sensor 21 will be transmitted to the calculating part 3.

The thermometer 11 shown in FIG. 1B has two (first and second) temperature sensors 211 and 212 in its temperature measuring part 2, disposed on the inner surface of the temperature measuring part 2 having a hollow interior respectively through different insulating materials 221 and 222 with different thermal characteristics (in terms of thermal conductivity, specific heat, density or any of their combinations). Since the insulating materials 221 and 222 are for the purpose of providing different thermal characteristics, either one of them may be dispensed with. Heat is thus transmitted to the first temperature sensor 211 through insulating material 221 and to the second temperature sensor 212 through insulating material 222. Both of the temperature sensors 211 and 212 are electrically connected to the calculating part 3 disposed inside the main body 7 such that outputs from the temperature sensors 211 and 212 are both transmitted to the calculating part 3.

Figure 3:
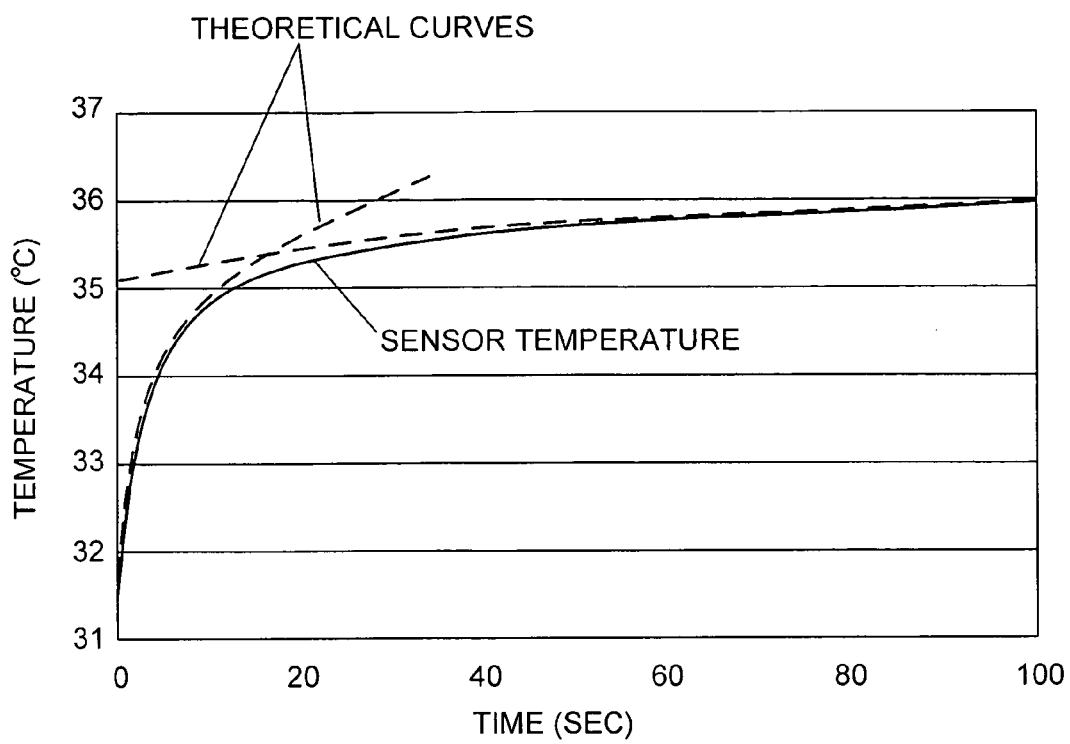
FIG. 3 is a graph of change in temperature of a temperature sensor from the moment when a measurement is started.

The temperature of a thermistor varies generally as shown in FIG. 3 from the moment when its measurement of temperature is started under an arm or inside the mouth. The temperature curve as shown in FIG. 3 is usually divisible into two parts with the boundary at about 20 seconds such that the curve in each part can be expressed by an equation of the form $T(t)=T_S-(T_S-T_0)\exp(-\alpha t)$ for the change of the temperature of a very small object which is being heated, where $T(t)$ is the temperature of the heated object at time t, $T_S$ is the temperature of the heater, $T_0$ is the initial temperature of the object and $\alpha$ is a constant.

During the initial period from the beginning of the measurement until about 20 seconds later, the temperature $T(t)$ of the thermistor may be considered to be controlled mainly by the surface temperature, the initial temperature of the probe and the heat transmission characteristic from the live body surface to the probe. During the period subsequent thereto, the temperature $T(t)$ of the thermistor may be considered to be controlled by the heat being transmitted from the interior of the live body to its surface due to the reaction of the organism and the manner of this temperature change depends on the individual. Prior art technologies have made use only of the temperature data during this later period.

In the above, however, the duration of the "initial period" is not uniquely determinable, depending on factors such as the initial temperature of the thermometer and the surface condition of the patient. If the thermometer has been kept in an unheated room in winter, for example, it is likely to take a relatively longer time before the reading on the thermometer may be said to be controlled more heavily by the heat being transmitted from the patient's body. For the purpose of this invention, the initial period may be considered to last for 3-30 seconds The surface temperature varies according to the relationship between the internal body temperature and the external environmental conditions. The manner of heat transfer to the probe also varies, depending on the surface condition and the contact condition. Even where the same patient is being measured, these conditions change from one time to another. This is why it has been the common practice in prior art technologies to obtain temperature data only after waiting for a sufficient length of time until the condition has stabilized. The basic idea of the present invention, instead, is to recognize that the accuracy of short-time temperature measurement can be improved by making use of the information on the inner body temperature, the environmental conditions, the heat transfer to the probe, the surface condition and the contact condition which are manifested in the manner of initial change in measured temperature.

Various parameters may be used according to this invention for representing the manner of temperature change in the initial period. One example of such parameter for a thermistor of the type having only one temperature sensor (such as the one shown in FIG. 2A) may be the time (shown by symbol $\tau(\text{sec})$ in FIG. 4) from the moment $t_m$ when the rate of temperature increase reaches a maximum value until the moment $t_n$ when it drops down to a specified value.

Figure 5:
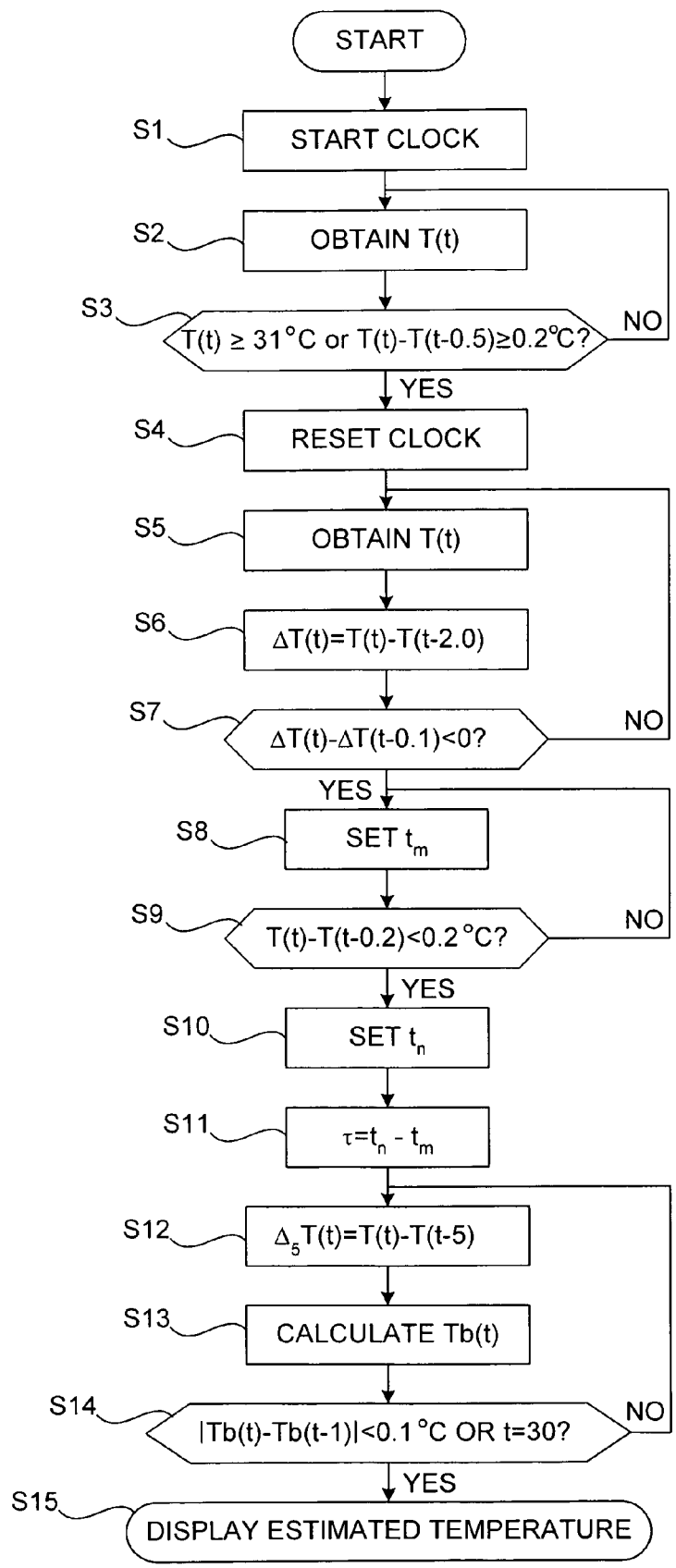
FIG. 5 is a flowchart of a method of this invention for estimating the inner body temperature.

FIG. 5 shows an example of method of this invention for estimating the inner body temperature at equilibrium by using such a parameter.

The process starts by starting a clock (Step S1) and measuring the temperature $T(t)$ periodically (Step S2) where t is the time in units of seconds. At the same time, the temperature differential (that is, the difference between the current temperature and the temperature measured 0.5 second earlier) $\Delta T(t)=T(t)-T(t-0.5)$ is calculated and monitored. When either T(t) reaches 31° C. or ΔT(t) is found to be 0.2° C. or higher (YES in Step S3), the clock is reset (Step S4) and starts counting time from t=0.

Figure 4:
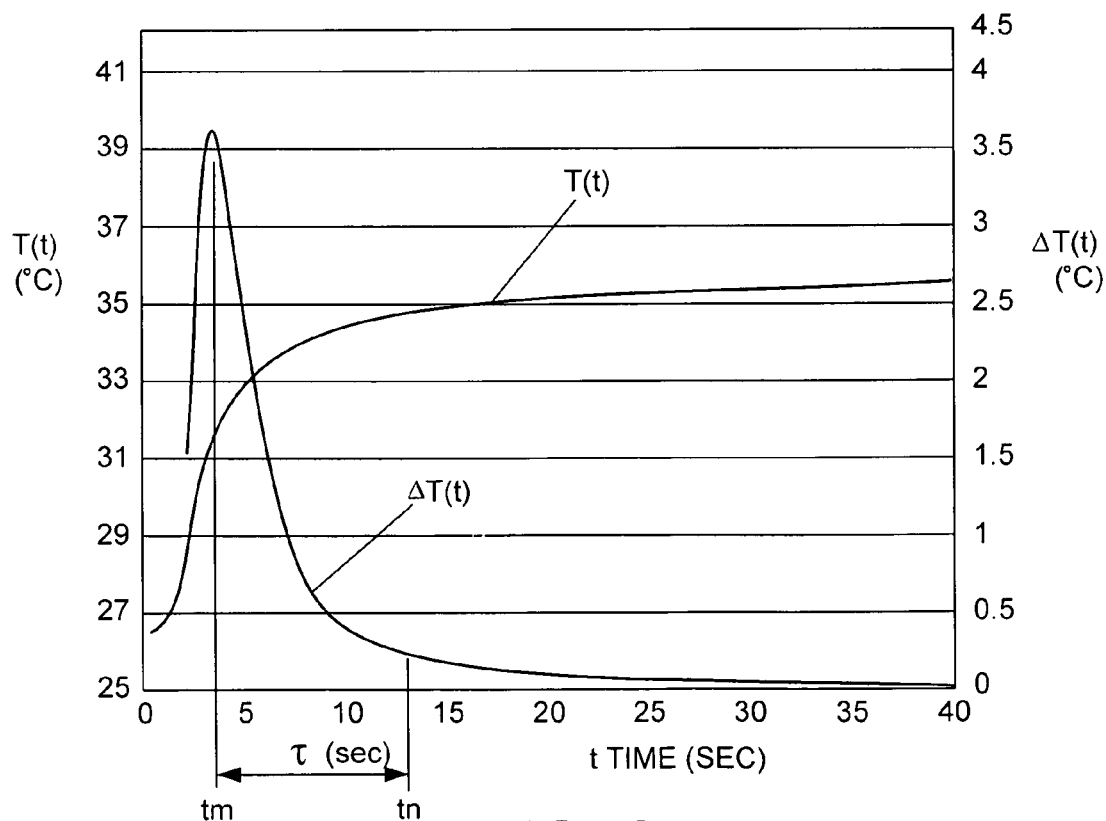
FIG. 4 is a graph of changes in temperature of a temperature sensor and its time-rate of change.

Temperature values T(t) continue to be obtained (Step S5) and the temperature change for the past 2 seconds is calculated as ΔT(t)={T(t)−T(t−2)} (Step S6). This continues on until the temperature change thus being calculated at any time t is found to have become smaller than that calculated 0.1 second earlier (Step S7). When the average rate of temperature change thus calculated becomes less than that calculated such a short time earlier (YES in Step S7), this time may be regarded as indicative of the moment when the actual rate of temperature change reaches a peak and hence the clock reading at this time is defined as $t_m$ as shown in FIG. 4 (Step S8). If the answer is NO in Step S7, earlier Steps S5 and S6 are repeated until such a peaking time.

After $t_m$ is thus defined, T(t) continues to be obtained. When the change in the measured temperature value T(t) over a two-second period becomes less than 0.2° C. (YES in Step S9) thereafter, the clock reading at this time is defined as $t_n$ (Step S10) and the time difference between $t_n$ and $t_m$ is defined as τ (Step S11) as shown in FIG. 4.

Next, a five-second temperature differential $\Delta_5 T(t)=T(t)−T(t−5)$ is calculated from the temperature value measured 5 seconds earlier (Step S12) and values of function $T_b(t)$ defined either as $$T_b(t)=AT(t)+B\Delta_5 T(t)+C\tau+D \qquad \text{Equation (1)}$$

or as $$T_b(t)=T(t)+E\Delta_5 T(t)+F\tau+G \qquad \text{Equation (2)}$$

are calculated repeatedly (Step S13).

Next, it is determined whether the change in $T_b(t)$ is smaller or not than a preliminarily specified value such as 0.1° C. or whether or not a specified length of time such as 30 seconds has passed (Step S14) since the clock was reset in Step S4. If such a condition is not satisfied (NO in Step S14), the process returns to Step S12. If the condition is satisfied (YES in Step S14), the value of $T_b(t)$ at that moment is displayed as the estimated equilibrium temperature (Step S15).

In Equations (1) and (2), A, B, C, D, E, F and G are constants that are preliminarily determined by a statistical method based on a large number of data.

Figure 6:
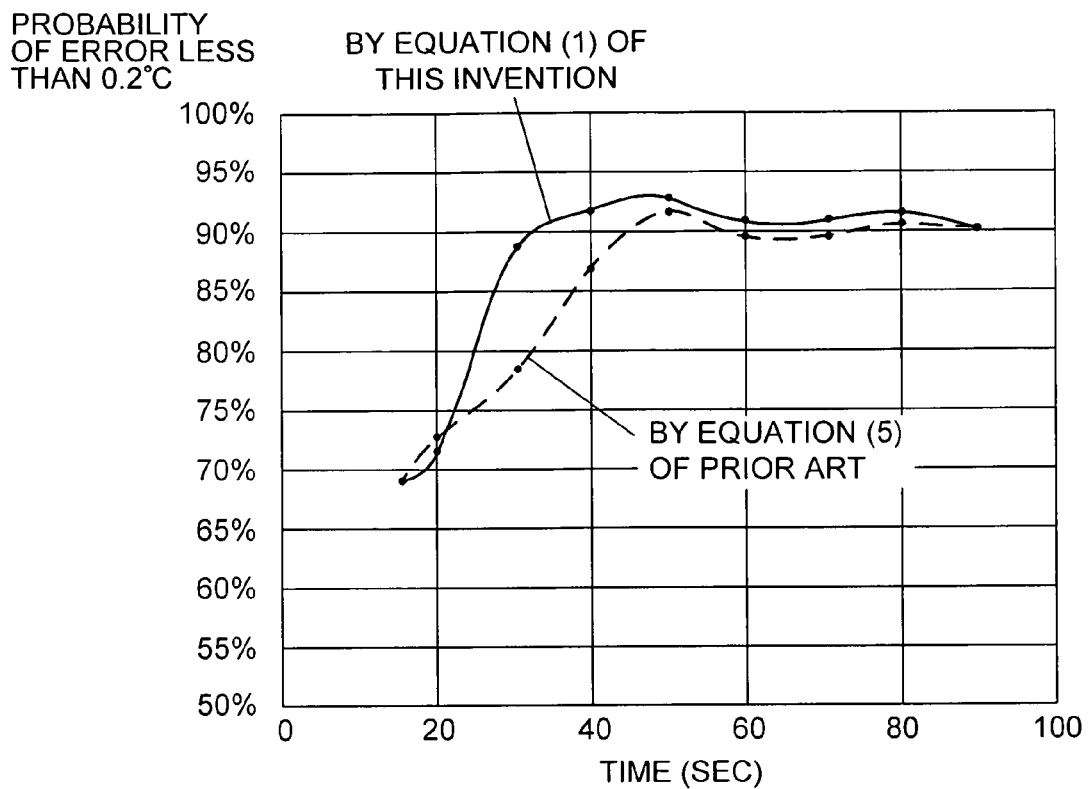
FIG. 6 is a graph for showing the results of comparison between methods of estimating equilibrium inner body temperature according to this invention and according to prior art technology.

It is to be noted that $T_b(t)$ according to this invention includes a term depending on τ determined from the temperature changes in the initial period after the beginning of the measurement. As a comparison with prior art technologies, a prior art form of equation $T_b(t)$ not dependent on τ and defined as $$T_b(t)=A'T(t)+B'\Delta_5 T(t)+C' \qquad \text{Equation (3)}$$

was used to estimate the equilibrium inner body temperature and compared with results obtained by using Equation (1). For this comparison test, time was divided into partitions of 10 second each and optimum values of A, B, C and D for Equation (1) and those of A', B' and C' for Equation (3) were obtained and these values were used to estimate the inner body temperatures of 77 persons. The results are shown in FIG. 6. For the time period of 30 seconds, the values of coefficients were A=0.725, B=5.536, C=0.0732 and D=10.857 for Equation (1) and A'=0.705, B'=4.815 and C'=11.123 for Equation (3).

FIG. 6 shows that an estimated temperature value as accurate as those obtained by further waiting can obtained after only about 30 seconds from the beginning of the measurement if Formula (1) according to this invention is used but that it takes about 50 seconds if Formula (3) according to a prior art technology is used in order to obtain an equally accurate estimate. In the graph of FIG. 6, the vertical axis indicates the probability of obtaining a result with error less than 0.2° C.

Figure 7:
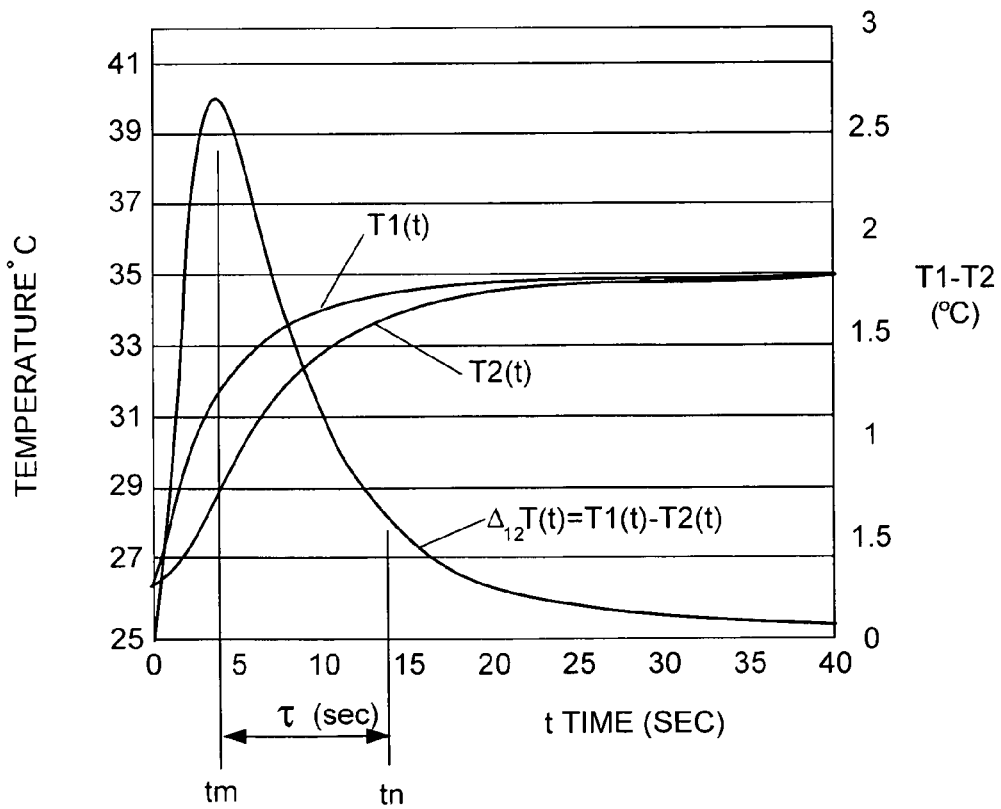
FIG. 7 is a graph for showing the changes in temperatures $T_1(t)$ and $T_2(t)$ measured by the two temperature sensors of FIG. 2B and the change in their difference.

In the case of a thermometer of the type having two temperature sensors as shown in FIG. 2B, the time (τ as shown in FIG. 7) it takes for the difference $\Delta_{12}T$ between the temperatures $T_1(t)$ and $T_2(t)$ measured respectively by the two temperature sensors 211 and 212 to change from its maximum value to a preliminarily specified value such as 0.5° C. may be used as a parameter indicative of the manner in which temperature changes during the initial period. Since $\Delta_{12}T=T_1(t)−T_2(t)$ becomes stabilized sufficiently after 30 seconds have passed as shown in FIG. 7, this value may be used as a parameter to make an accurate estimate within a shortened time.

Alternatively, the maximum time-rate of change in temperature or the time it takes until the maximum time-rate of change is reached may be used as the parameter indicative of the manner of temperature change during the initial period.

Figure 8:
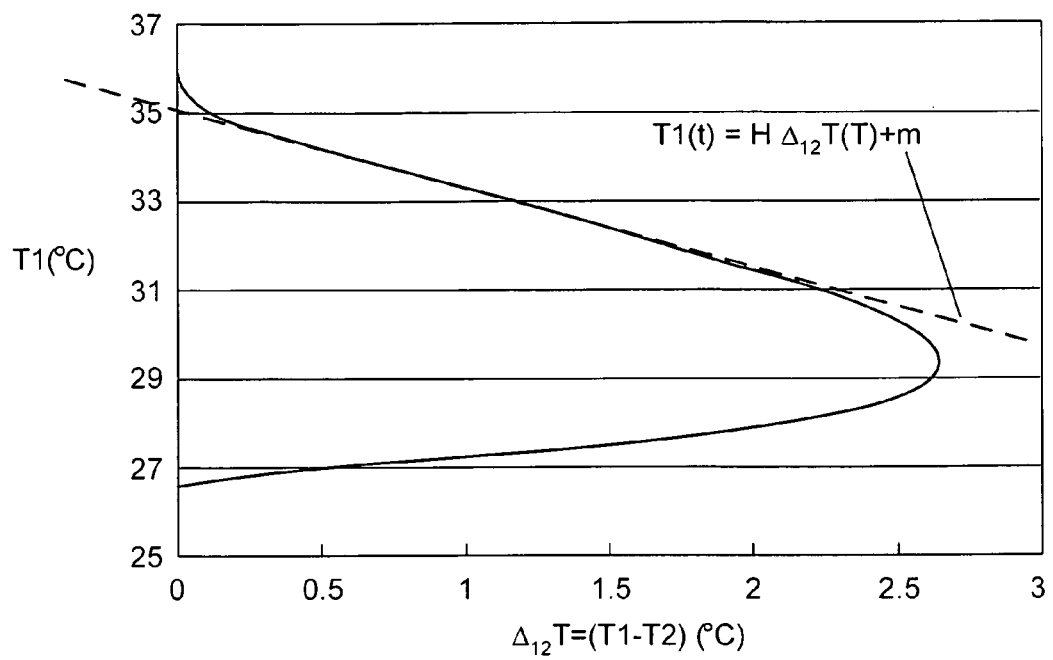
FIG. 8 is a graph for showing the relationship between the difference $T_1(t)-T_2(t)$ and $T_1(t)$.
Figure 10:
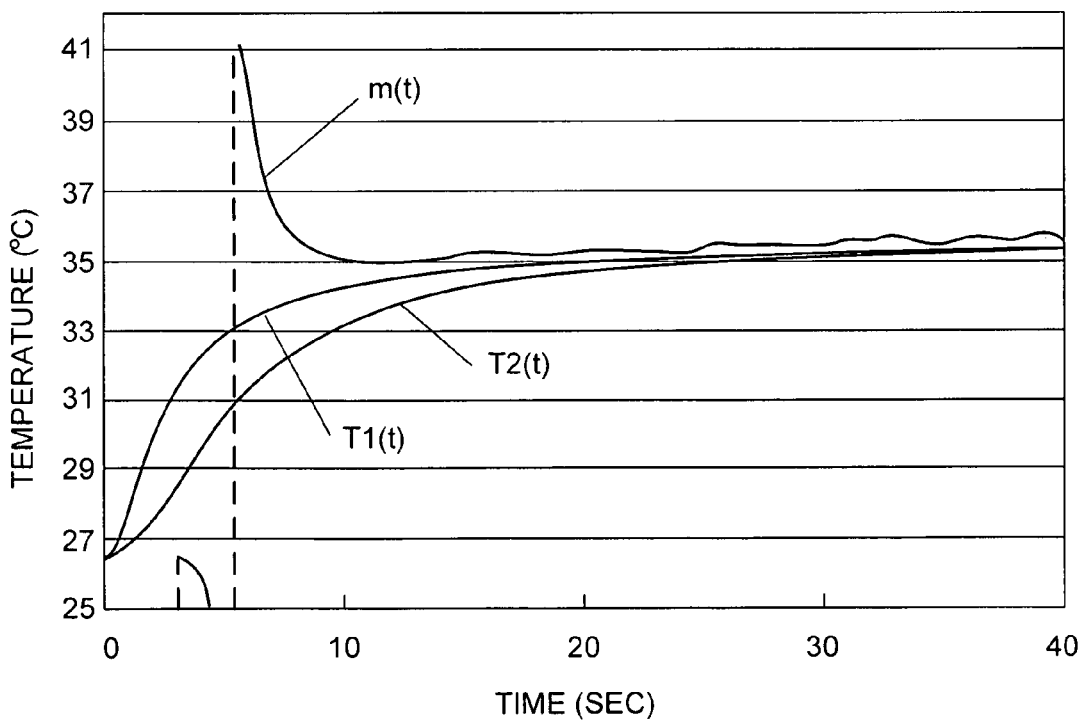
FIG. 10 is a graph showing the changes in T1, T2 and m in the method of FIG. 9.

If a thermometer as shown in FIG. 2B having two temperature sensors is used, it becomes possible to use a parameter of a different kind to estimate the equilibrium inner body temperature. For example, it is possible to make use of the linear relationship between the aforementioned difference $\Delta_{12}T(t)=T_1(t)−T_2(t)$ between the temperatures measured by the two temperature sensors and either of the temperatures measured by one of the temperature sensors is made use of to obtain a parameter indicative of the initial period of the measurement. Explained more in detail, if the aforementioned linear relationship as shown in FIG. 8 is written in the form of $T_1(t)=H\Delta_{12}T(t)+m$, either H or m in the equation may be used as the parameter.

A process for estimating the equilibrium inner body temperature by using two sensors and using m as a parameter will be explained next.

Figure 9:
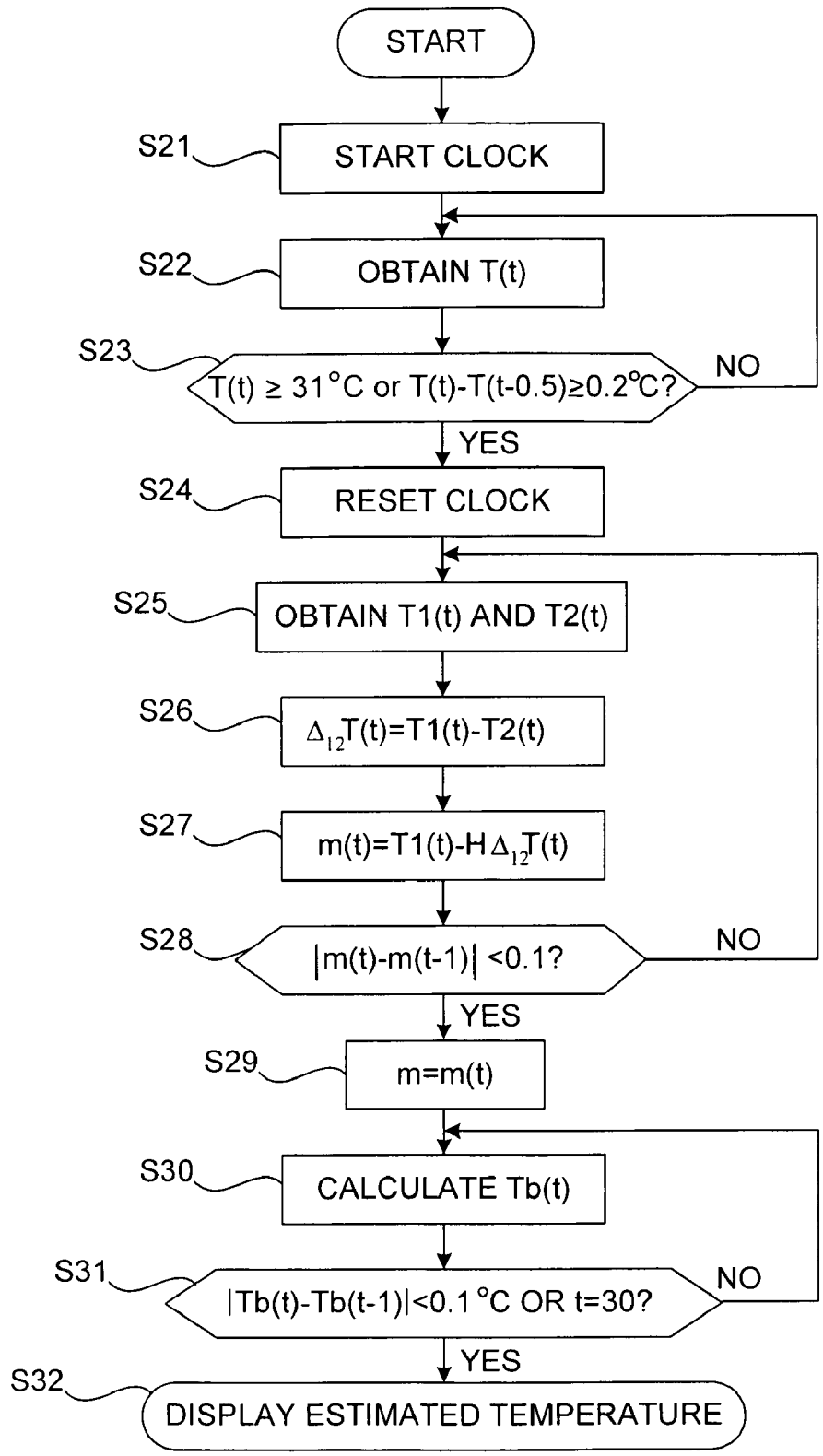
FIG. 9 is a flowchart of another method of this invention for estimating the inner body temperature by using a thermometer with two temperature sensors.

In the flowchart shown in FIG. 9, Steps S21-S24 are the same as Steps S1-S4 of FIG. 5 and hence will not be explained repetitiously. After the clock is reset in Step S24, temperature values T1(t) and T2(t) respectively measured by the two temperature sensors 211 and 212 are obtained (Step S25), their difference $\Delta_{12}T(t)=T_1(t)−T_2(t)$ is calculated (Step S26) and m(t) is calculated therefrom (Step S27). The change in the value of m(t) over a one-second period is also calculated, and when the absolute value of this change becomes less than a certain value (0.1° C. in this example), the value of m(t) at that time is defined as m (Step S29).

Thereafter, a five-second temperature differential $\Delta_5 T(t)=T(t)−T(t−5)$ is calculated from the temperature value measured five seconds earlier, as done in Step S12 of the flowchart shown in FIG. 5 and values of function $T_b(t)$ defined either as $$T_b(t)=IT(t)+J\Delta_5 T(t)+Km+L \qquad \text{Equation (4)}$$

or as $$T_b(t)=T(t)+N\Delta_5 T(t)+Om+P \qquad \text{Equation (4)}$$

are calculated (Step S30) where I, J, K, L, N, O and P are preliminarily determined constants.

Next, it is determined whether or not the change in $T_b(t)$ is smaller than a preliminarily specified value such as 0.1° C. over a period of one second or whether or not a specified length of time such as 30 seconds has passed (Step S31)

since the clock was reset in Step S24. If such a condition is not satisfied (NO in Step S31), the process returns to Step S30. If the condition is satisfied (YES in Step S31), the value of $T_b(t)$ at that moment is displayed as the estimated equilibrium temperature (Step S32).

According to this invention, an accurate estimate of body temperature is possible within a short period of only about 30 seconds by taking into consideration initial data on the temperature curve.

What is claimed is:

1. An electronic clinical thermometer comprising:
a temperature measuring device for measuring a live body temperature; and
a temperature estimating device for estimating an equilibrium body temperature from a first data item related to change in temperature measured by said temperature measuring device during an initial period from the start of a measurement until a specified condition becomes satisfied and a second data item. related to change in temperature measured by said temperature measuring device after said initial period;
wherein said initial period ends when a peak is detected in the time-rate of change in temperature measured by said temperature measuring device.

2. The electronic clinical thermometer of claim 1 wherein said first data item is a physical quantity other than temperature.

3. The electronic clinical thermometer of claim 2 wherein said first data item relates to the time length during which the temperature measured by said temperature measuring device continues to rise and said second data item is a time-rate of change in temperature.

4. The electronic clinical thermometer of claim 3 wherein said first data item relates to the time length from when the time-rate of change in temperature measured by said temperature measuring device reaches a peak until the time-rate of change in temperature measured by said temperature measuring device reaches a predetermined value.

5. An electronic clinical thermometer comprising:
a temperature measuring device for measuring a live body temperature; and
a temperature estimating device for estimating an equilibrium body temperature from a first data item related to change in temperature measured by said temperature measuring device during an initial period from the start of a measurement until a specified condition becomes satisfied and a second data item related to change in temperature measured by said temperature measuring device after said initial period;
wherein said initial period is 3-30 seconds;
wherein said first data item is a physical quantity other than temperature; and
wherein said first data item relates to the time length during which the temperature measured by said temperature measuring device continues to rise and said second data item is a time-rate of change in temperature.

6. The electronic clinical thermometer of claim 5 wherein said first data item relates to the time length from when the time-rate of change in temperature measured by said temperature measuring device reaches a peak until the time-rate of change in temperature measured by said temperature measuring device reaches a predetermined value.

7. An electronic clinical thermometer comprising:
a temperature measuring device for measuring a live body temperature; and
a temperature estimating device for estimating an equilibrium body temperature from a first data item related to change in temperature measured by said temperature measuring device during an initial period from the start of a measurement until a specified condition becomes satisfied and a second data item related to change in temperature measured by said temperature measuring device after said initial period;
wherein said first data item is a physical quantity other than temperature and is based on the time-rate of change in temperature measured by said temperature measuring device.

8. The electronic clinical thermometer of claim 7 wherein said first data item includes the duration of time from when the time-rate of change in temperature measured by said temperature measuring device reaches said peak until the time-rate of change in temperature measured by said temperature measuring device drops to said predetermined value.

9. An electronic clinical thermometer comprising:
a temperature measuring device for measuring a live body temperature; and
a temperature estimating device for estimating an equilibrium body temperature from a first data item related to change in temperature measured by said temperature measuring device during an initial period from the start of a measurement until a specified condition becomes satisfied and a second data item related to change in temperature measured by said temperature measuring device after said initial period;
wherein said temperature measuring device is one of two temperature measuring devices placed at two different body positions with different thermal characteristics, wherein said first data item relates to the difference between temperatures measured by said two temperature measuring devices and wherein said second data item relates to a time-rate of change in temperature measured by either of said two temperature measuring devices; and
wherein said first data item is a value obtained from the linear relationship between a temperature value measured by either of said two temperature measuring devices and the difference between the temperatures measured by said two temperature measuring devices.

10. The electronic clinical thermometer of claim 9 wherein said initial period is 3-30 seconds and wherein said first data item is a value obtained from the linear relationship between a temperature value measured by either of said two temperature measuring devices and the difference between the temperatures measured by said two temperature measuring devices.

11. An electronic clinical thermometer comprising:
a temperature measuring device for measuring a live body temperature; and
a temperature estimating device for estimating an equilibrium body temperature from a first data item related to change in temperature measured by said temperature measuring device during an initial period from the start of a measurement until a specified condition becomes satisfied and a second data item related to change in temperature measured by said temperature measuring device after said initial period;
wherein said temperature measuring device is one of two temperature measuring devices placed at two different body positions with different thermal characteristics, wherein said first data item relates to the difference between temperatures measured by said two temperature measuring devices and wherein said second data item relates to a time-rate of change in temperature measured by either of said two temperature measuring devices; and wherein said initial period ends when the difference between the temperatures measured by said two temperature measuring devices drops to a predetermined value after reaching a peak.

12. The electronic clinical thermometer of claim 11 wherein said first data item is a value obtained from the linear relationship between a temperature value measured by either of said two temperature measuring devices and the difference between the temperatures measured by said two temperature measuring devices.

13. The electronic clinical thermometer of claim 11 wherein said first data item includes the duration of time from when the difference between the temperatures measured by said two temperature measuring devices reaches a peak until said difference between the temperatures measured by said two temperature measuring devices drops to a predetermined value.

* * * * *